United States Patent [19]

Compton et al.

[11] Patent Number: 4,581,979
[45] Date of Patent: Apr. 15, 1986

[54] SHIPPING AND INSTALLATION RESTRAINING CLIP FOR MASTER CYLINDER INPUT MEMBER

[75] Inventors: David J. Compton, Troy; David J. Kyte, Mt. Clemens, both of Mich.

[73] Assignee: Automotive Products plc, Warwickshire, England

[21] Appl. No.: 509,998

[22] Filed: Jul. 1, 1983

[51] Int. Cl.⁴ .................. B65D 63/00; B60T 11/30
[52] U.S. Cl. ..................... 92/23; 24/16 PB; 192/85 R
[58] Field of Search ............. 24/16 R, 16 PB, 17 AP; 60/635, 636; 92/15, 23; 192/85 R, 85 CA, 91 A; 403/2, 12

[56] References Cited

U.S. PATENT DOCUMENTS

| | | | |
|---|---|---|---|
| 2,397,516 | 4/1946 | Stewart | 92/23 X |
| 2,512,150 | 6/1950 | Geren | 92/23 X |
| 3,662,653 | 5/1972 | Carlson et al. | 92/15 |
| 3,982,648 | 9/1976 | Luedtke et al. | 214/776 |
| 4,043,253 | 8/1977 | Albright et al. | 92/25 |
| 4,122,758 | 10/1978 | Bieringer et al. | 92/23 |
| 4,373,851 | 2/1983 | Confoey | 92/23 X |
| 4,454,632 | 6/1984 | Nix et al. | 92/23 X |

FOREIGN PATENT DOCUMENTS

| | | |
|---|---|---|
| EP-A1-099700 | 1/1984 | European Pat. Off. . |
| 3129481 | 9/1982 | Fed. Rep. of Germany .... 192/85 R |
| 0577947 | 6/1946 | United Kingdom . |
| 1200475 | 7/1970 | United Kingdom . |
| 1403466 | 8/1975 | United Kingdom . |
| 2021694 | 12/1979 | United Kingdom . |
| 2056547 | 3/1981 | United Kingdom . |
| 2072736 | 10/1981 | United Kingdom . |
| 2091796 | 8/1982 | United Kingdom . |

*Primary Examiner*—Tony M. Argenbright
*Assistant Examiner*—W. R. Wolfe
*Attorney, Agent, or Firm*—Hauke and Patalidis

[57] ABSTRACT

A disposable shipping and installation clip holding in an extended position the input member of a linear actuator, such as the input member of a hydraulic master cylinder operating a remotely located slave cylinder connected to the master cylinder through a conduit, the apparatus being filled with hydraulic fluid prior to shipment and installation on a utilization mechanism. The clip has a generally U-shaped channel body having sidewall portions elastically spreadable apart from each other such as to permit clipping the channel body over the input member. The clip body is preferably provided with outwardly extending projecting portions, finger-graspable, to facilitate removal. In the alternative, the clip is in the form of a U-shaped flat washer disposed in a groove in the input member periphery.

29 Claims, 13 Drawing Figures

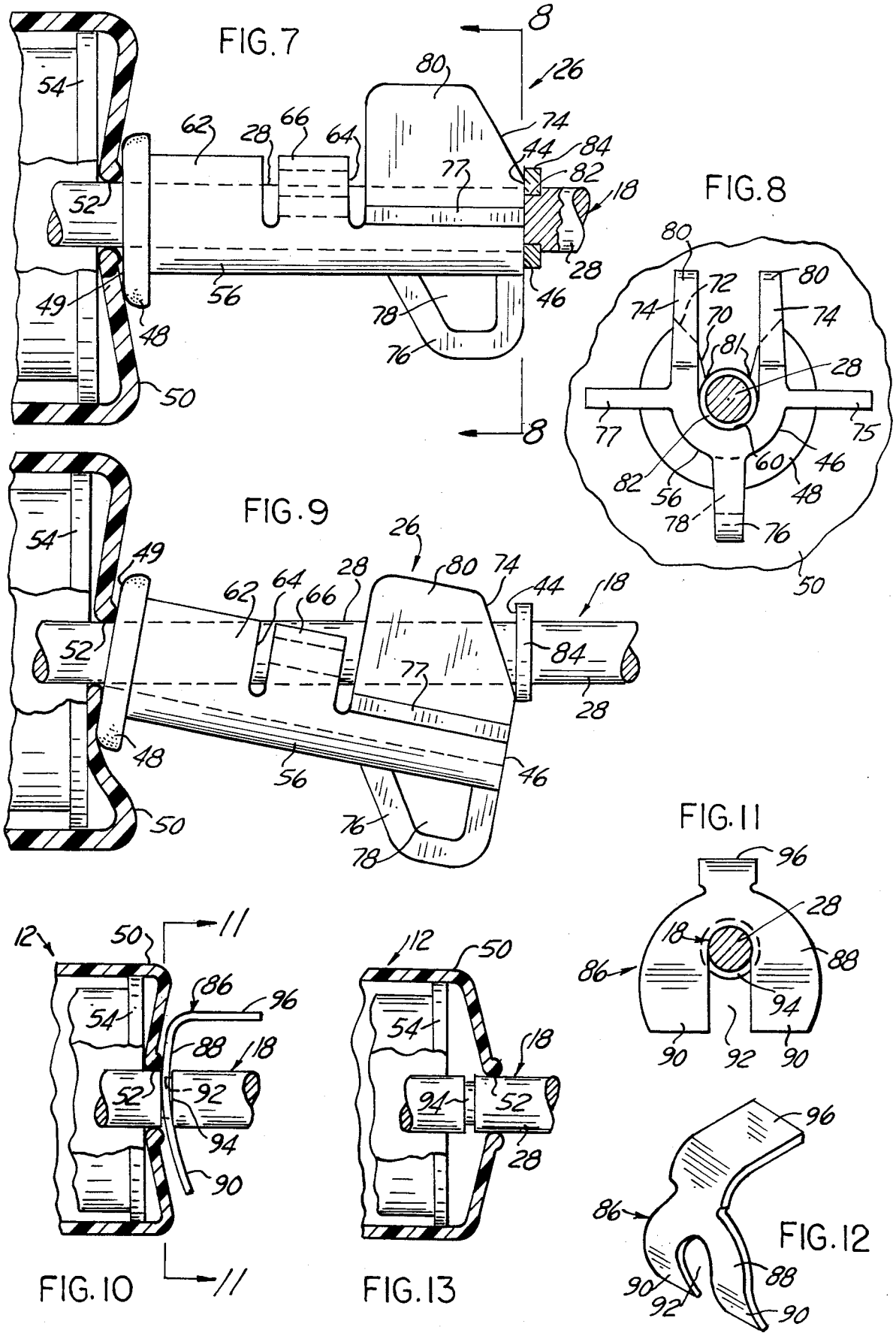

SHIPPING AND INSTALLATION RESTRAINING CLIP FOR MASTER CYLINDER INPUT MEMBER

BACKGROUND OF THE INVENTION

The present invention relates to a removable shipping and installation clip for holding the input member of a master cylinder such as the master cylinder of a hydraulic clutch control for a motor vehicle and the like, in an extended position, such as to prevent premature operation of the slave cylinder operable by the master cylinder.

In co-pending application Ser. Nos. 344,495, now is U.S. Pat. No. 4,454,632 Ser. No. 417,336 now U.S. Pat. No. 4,557,361 and Ser. No. 477, 162, all assigned to the same assignee as the present application, there are disclosed apparatus for remotely operating a mechanism, such as a motor vehicle mechanical clutch. The apparatus comprises a master cylinder and a slave cylinder interconnected by a conduit such that to each displacement of the input member of the master cylinder, displacing in turn a piston internally disposed in the master cylinder, corresponds a displacement of the output member of the slave cylinder through flow of hydraulic fluid from the master cylinder to the slave cylinder. The apparatus is pre-assembled and prefilled with hydraulic fluid prior to shipment to a motor vehicle manufacturer for installation on a motor vehicle on the assembly line. A restraining strap is installed on the slave cylinder for maintaining the slave cylinder output member in a retracted position during transportation of the apparatus from its manufacturer to the motor vehicle manufacturer, and during installation of the prefilled apparatus on a motor vehicle. The restraining function of the shipment and installation strap is arranged to cease upon first actuation of the slave cylinder and to allow thereafter normal operation of the slave cylinder output member.

Preassembled, prefilled and pretested hydraulic control apparatus for motor vehicle mechanical clutches greatly facilitate the installation of clutch control systems on the assembly line of a motor vehicle manufacturer. Whether the slave cylinder is mounted on the outside of the clutch bell housing with its output member adapted to operate the clutch release lever, or whether the slave cylinder is of the annular type installed within the bell housing concentric with the driveshaft and adapted to directly actuate the clutch throw-out bearing, the restraining strap holding in a retracted position the output member of the slave cylinder greatly facilitates the installation of the slave cylinder forming part of the prefilled hydraulic apparatus, as it does away with the necessity of retracting the output member prior to installing the slave cylinder on a motor vehicle. However, the purpose of the restraining strap is defeated if the input member of the master cylinder is accidentally reciprocated between the time that the apparatus is fully assembled and the time that the apparatus is fully installed on a motor vehicle.

It is a common practice in the industry, during assembly of motor vehicles provided with a hydraulic apparatus for operating the mechanical clutch of the motor vehicle, to first install the master cylinder in an appropriate mounting aperture in the bulkhead or firewall of the driver compartment and to connect the input member to the clutch control pedal, at a specific assembly station on the body assembly line. The slave cylinder, attached on the end of the flexible hose connecting the master cylinder to the slave cylinder, is simply left suspended on the end of the hose or is attached by means of a string or wire to the front of the firewall until the body assembly line and the chassis assembly line converge at the "body drop" section where the body is placed on the top of the motor vehicle chassis of frame. At some other station, downstream of the body drop station, the slave cylinder is installed in its operative position on a mounting member forming part of the clutch bell housing, or within the bell housing, according to the type of slave cylinder being installed. If, during the time interval between installation of the master cylinder in the motor vehicle body and installation of the slave cylinder in its operating position, the clutch pedal has been accidentally depressed, the advantages provided by the slave cylinder restraining strap are lost, as the output member of the slave cylinder is no longer held in a retracted position facilitating mounting of the slave cylinder in its operative position.

SUMMARY OF THE INVENTION

The principal object of the present invention is to provide means preventing actuation of the input member of the master cylinder of a hydraulic control apparatus which is preassembled and prefilled with hydraulic fluid prior to installation on a motor vehicle, where it is desired to maintain the "ready to install" integrity of the apparatus after assembly, prefilling and testing at the manufacturing plant, and during shipment of the apparatus from the manufacturing plant, during storage and in-plant transportation until the apparatus is completely installed on a motor vehicle on the motor vehicle assembly line.

The present invention accomplishes its objects by way of a disposable, but reuseable if so desired, shipping and installation clip preventing accidental or undesired operation of the master cylinder input member prior to and during installation of the apparatus on a motor vehicle, until the apparatus has been fully installed on the motor vehicle and is in a functional status. These and other objects and advantages of the present invention will become apparent to those skilled in the art when the following description of an example of structure for practicing the invention, given for illustrative purpose only, is read in conjunction with the accompanying drawing wherein like reference numerals refer to like or equivalent parts and in which:

BRIEF DESCRIPTION OF THE DRAWING

FIGS. 7, 8 and 9 are views similar to FIGS. 2, 4 and 6, but showing a modification of the invention;

FIG. 10 is a view similar to FIG. 2, but showing a further modification of the invention;

FIG. 11 is a section through line 11—11 of FIG. 10;

FIG. 12 is a perspective view of the shipping and installation restraining clip of FIGS. 10-11; and FIG. 13 is a view similar to FIG. 10, but showing the master cylinder rod with the spacer removed.

DETAILED DESCRIPTION OF THE PREFERRED EMBODIMENTS

Figure 1:
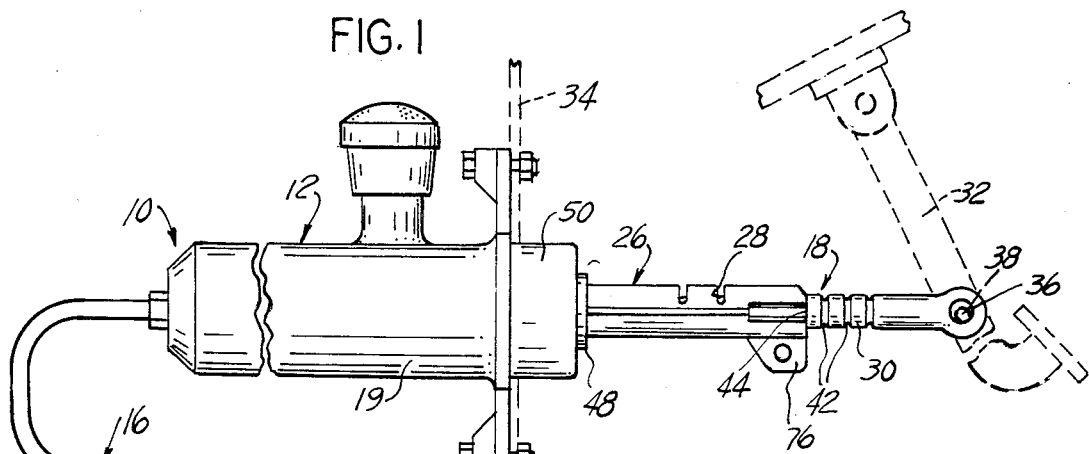
FIG. 1 is a schematic illustration of a hydraulic apparatus comprising a slave cylinder provided with a shipping and installation restraining strap and the master cylinder being provided with an example of structure for a shipping and installation restraining clip according to the present invention.

Referring now to the drawing, and more particularly to FIG. 1, there is schematically illustrated a hydraulic apparatus assembly 10 comprising a master cylinder 12 hydraulically interconnected to a slave cylinder 14 by means of a conduit 16 in the form of a flexible hose. The master cylinder 12 has a linearly reciprocable input member 18 connected at an end to a piston, not shown, disposed reciprocable within the master cylinder housing 19. The slave cylinder 14 is provided with a linearly reciprocable output member 20 actuated by a reciprocable piston, not shown, disposed within the slave cylinder housing 21. As is well known, any inward displacement of the master cylinder input member 18 causes a corresponding outward displacement of the slave cylinder output member 20 as a result of transferring hydraulic fluid from the master cylinder 12 to the slave cylinder 14 through the line or conduit 16.

After assembly of the diverse components, the apparatus 10 is fulled with hydraulic fluid under slight pressure, an appropriate bleed valve, not shown, preferably mounted on the slave cylinder 14 allowing air to escape from the apparatus. Alternatively, the apparatus 10 may be filled with hydraulic fluid by first evacuating the atmospheric air from the apparatus and filling the apparatus with hydraulic fluid as disclosed in application Ser. No. 599,249, filed Apr. 11, 1984, now U.S. Pat. No. 4,503,678, issued Mar. 12, 1985, for Improvement to Reservoirs for Liquid Pressure Control System.

A restraining strap 22 is installed on the slave cylinder 14 in such manner as to hold the output member 20 of the slave cylinder in a retracted position during shipment of the prefilled hydraulic apparatus 10 to, for example, a motor vehicle manufacturer, and until the apparatus 10 has been completely installed on a motor vehicle on the motor vehicle assembly line. The restraining strap 22 may be made of elastomeric material or of relatively non-elastic material, in which case the restraining strap 22 is discarded after the slave cylinder 14 has been installed on a motor vehicle with the end of its ouput member 20 in engagement, for example, with the mechanical clutch operating lever 24. Alternatively, and preferably, the restraining strap 22 is of the type disclosed in detail in applications Ser. No. 344,495 now U.S. Letters Pat. No. 4,454,632, Ser. No. 417,336 now U.S. Pat. No. 4,557,361 and 477,162 filed 3-21-83, all assigned to the same assignee as the present application, the restraining strap 22 being provided with portions of reduced strength which break such as to free the slave cylinder output member 20 upon first actuation of the master cylinder input member 18, causing in turn actuation of the slave cylinder output member 20.

A removable shipping and installation clip, in the form of a clip-on spacer 26, is installed about the input member 18 of the master cylinder 12. The clip-on spacer 26 holds the master cylinder input member 18 in an extended position after assembly of the apparatus 10, during shipment of the apparatus to the motor vehicle manufacturer, and until the apparatus 10 has been completely installed in a motor vehicle on the motor vehicle assembly line.

Figure 2:
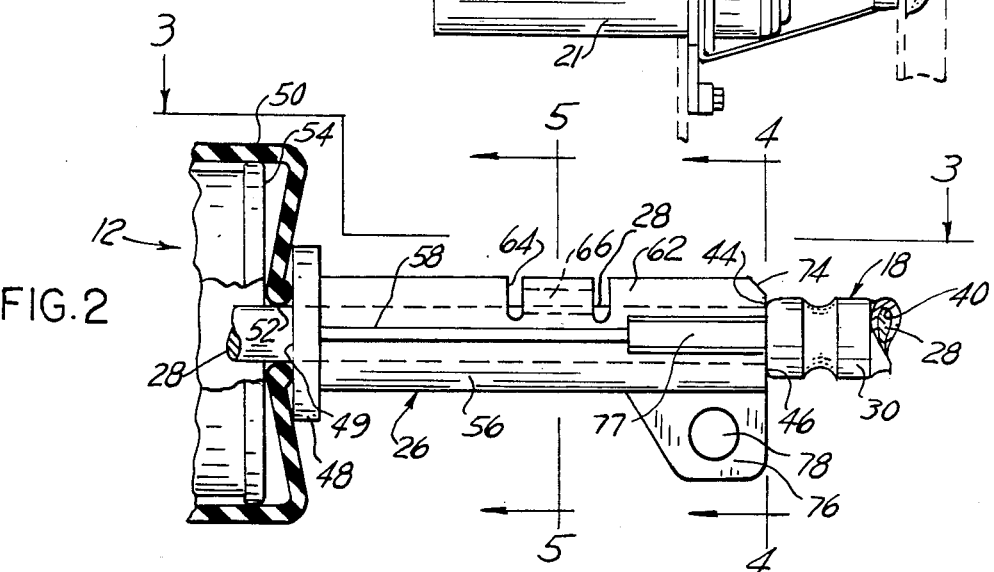
FIG. 2 is a partial view similar to FIG. 1, but shown at an enlarged scale.
Figure 3:
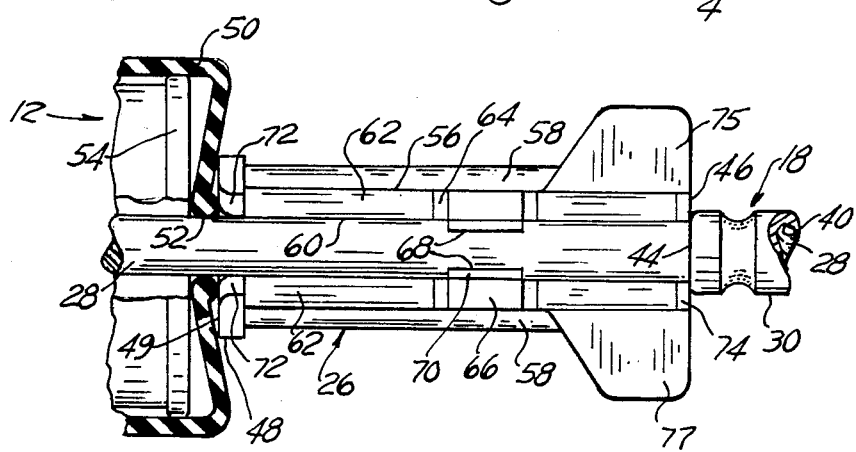
FIG. 3 is a top view thereof from line 3—3 of FIG. 2.

As shown in the drawing, and more particularly at FIGS. 1-3, in the example of structure illustrated the master cylinder input member 18 is made of two sections, one being the piston actuating rod 28, and the other an extension member 30 arranged to couple the end of the rod 28 to a pivotable clutch pedal arm 32, FIG. 1, mounted in the driver compartment of a motor vehicle, the master cylinder 12 being attached in position through an opening in the driver compartment bulkhead or firewall 34, with its input member 18 projecting within the driver compartment. For that purpose, the coupling extension member 30 is provided with a clevis eye 36 on its free end for pivotable coupling to the clutch pedal arm 32 by means, for example, of an appropriate pin 38 and an appropriate retaining means such as a cotter pin or the like, not shown, preventing the clevis eye 36 from becoming disengaged from around the pin 38.

The extension member 30 is attached to the rod 28 by any convenient means, such as by welding or, preferably and as shown, by being provided with a tubular end portion 40 press-fitted over the end of the rod 28, appropriate affixing of the extension member 30 on the end of the rod 28 being accomplished by crimping, as shown at 42 at FIG. 1, the wall of the tubular portion of the extension member 30 into appropriate peripheral grooves, not shown, disposed at the end of the rod 28. The end of the extension member 30 attached to the rod 28 forms an annular shoulder 44 abutting against an end surface 46 of the clip-on spacer 26. The other end of the clip-on spacer 26 has a flange 48 having an end face 49 in abutting engagement with the end face of the elastomeric boot 50 covering the end of the master cylinder 12, through which projects the actuating rod 28. The elastomeric boot 50 forms a protective seal preventing introduction of dirt within the master cylinder while still permitting the rod 28 to reciprocate. For that purpose, the boot 50, as shown in detail at FIGS. 2 and 3 has a generally central opening 52 forming a lip elastically engaged with the peripheral surface of the rod 28, such that dirt is prevented from entering into the master cylinder 12 through the opening in the cylinder end cover 54. It will be readily appreciated that the end face 49 of the flange 48 of the clip-on spacer 26, although normally engaged with the end face of the elastomeric boot 50 is, for all practical purposes, functionally arrested against longitudinal motion by the end face of the cylinder cover 54, an elastic cushion with very limited compressibility being interposed between the end face 49 of the flange 48 and the end face of the cover 54, defined by the portion of the boot 50 proximate the aperture 52 through which reciprocates the piston push-rod 28 of the master cylinder 12.

In the structure illustrated, the clip-on spacer 26 comprises a partially tubular body 56 generally in the form of a U-shaped channel member preferably made of a molding of relatively non-compressible but slightly elastic plastic material. An example of convenient plastic material is a glass fiber reinforced polymeric amide, or nylon, resin such as sold under the trademark Zytel by E.I. DuPont deNemours & Co.

Figure 4:
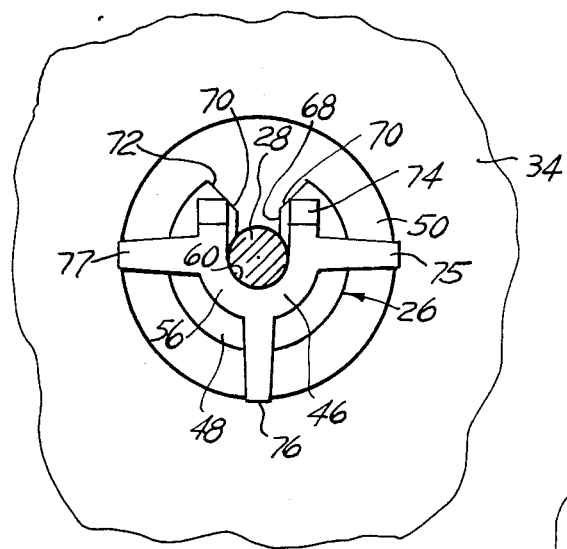
FIG. 4 is a section thereof through line 4—4 of FIG. 2.
Figure 5:
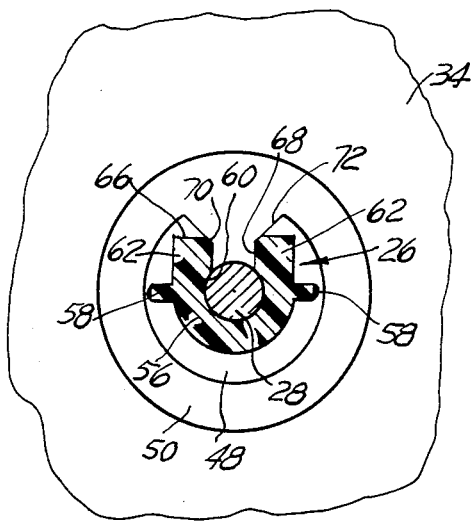
FIG. 5 is a section thereof through line 5—5 of FIG. 2.

The spacer body 56 is preferably provided on its exterior surface with a pair of longitudinally extending integral reinforcing ribs 58, and has a semi-circularly cylindrical interior surface 60 encircling the periphery of the master cylinder piston push-rod 28 on about 180° of its circumference, and a pair of integral substantially parallel sidewalls 62. A pair of parallel slots 64, extending from the top of each sidewall 62 to proximate the longitudinal reinforcing rib 58, form in each sidewall 62 a resiliently spreadable wing portion 66 provided on its interior with an inwardly projecting land 68, the distance separating the surface of the two opposite lands 68 being slightly less than the diameter of the push-rod 28. The top inner edge of each resiliently spreadable sidewall wing portion 66 provided with the land 68 is tapered, as shown at 70 to facilitate introduction of the push-rod 28 between the wing portion 66, thus resiliently deflecting the sidewall wing portions 66 away from each other, to enable passage therebetween of the push-rod 28 when the clip-on spacer 26 is manually pressed over the push-rod 28, until a portion of the peripheral surface of the push-rod 28 bottoms in the semi-circularly cylindrical surface 60 of the U-shaped channel body 56 of the spacer 26. The sidewall wing portions 66 spring back to the position illustrated at FIGS. 3-5, with the result that the push-rod 28 is trapped within the U-shaped channel body 56 of the spacer 26, in engagement with semi-circular cylindrical surface 60, and below the projecting lands 68 on the inner surface of the sidewall wing portions 66. The clip-on spacer 26 thus prevents accidental premature retraction of the master cylinder input member 18, as a result of its end face 46 being in engagement with the annular shoulder abutment 44, and the end surface 49 of its flange 48 being in engagement with the end face of the boot 50.

The spacer end flange 48 has a cut-out portion for passage over the push-rod 28, the cut-out portion having tapered edges as shown at 72, acting as a pilot and guide means aiding in centrally locating the spacer body 56 when manually pressed about the periphery of the push-rod 28. The top edge corner of each sidewall 62 is cut off at an angle such as to form a taper, as shown at 74, FIGS. 2-3 and 6 to provide some clearance relative to the annular abutment 44 on the input member 18 during installation of the clip-on spacer 26, and during removal after installation of the apparatus 10 on a motor vehicle, when it is desired to place the apparatus in a functional status.

Figure 6:
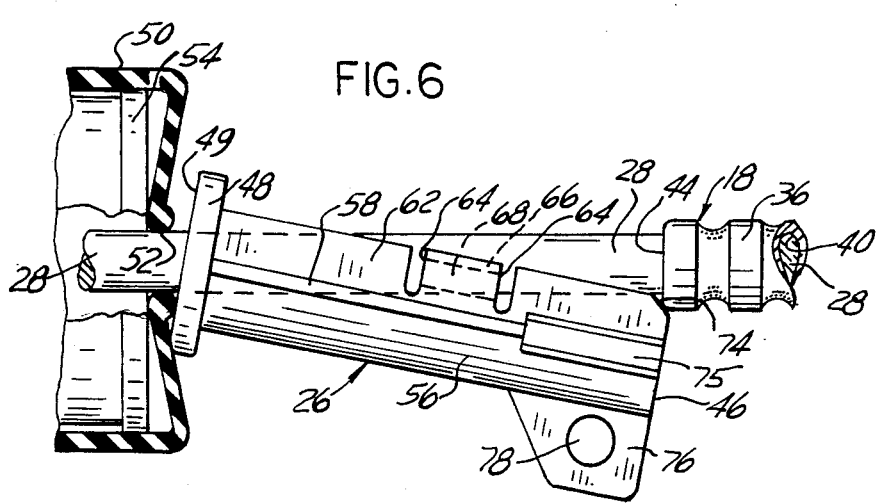
FIG. 6 is a view similar to FIG. 2 useful in explaining the operation of the spacer of the invention.

At least one, and preferably three, ears as illustrated at 75, 76 and 77, outwardly radially projecting from the spacer body 56 at its end provided with the abutment end face 46, are molded integrally with the body 56. Two of the ears, 75 and 77, are disposed substantially in a diametral plane, and the third ear, 76, is disposed in a plane substantially perpendicular to the plane in which are disposed the ears 75 and 77. One of the ears, for example ear 76, is pierced, as shown at 78, such that, in addition to the ears 75-77 providing a convenient finger-graspable means for removing the spacer 26 from its shipment and installation position about the master cylinder input member 18, the spacer 26 may be literally peeled off the master cylinder input member 18 at some station on the assembly line by means of a tool in the form of a hook or of a ice pick, by introducing the tip of the hook or ice pick into the aperture 78 in the ear 76, and pulling, as illustrated at FIG. 6 which shows the spacer 26 being partially removed from the master cylinder input member 18.

With reference to FIGS. 7-9, there is illustrated a shipping and installation clip-on spacer 26, of a structure identical to that of the clip-on spacer 26 of FIGS. 1-6, the sidewalls 62 being provided, however, with a top extension portion 80 at their portion proximate the end abutment surface 46 normally in engagement with the annular shoulder 44 of the master cylinder input member 18. The extended sidewall portions 80 act as further piloting and guiding members, when the clip-on spacer 26 of FIGS. 7-9 is placed over the piston rod 28, and as additional finger-push means while removing the clip-on spacer 26 from over the piston rod 28. The spreadable sidewall portions 66 are provided, on their inner surface, with a ramp 70, FIG. 8, causing the sidewall portions 66 to elastically spread apart when the spacer 26 is installed in position by pressing over the piston rod 28, until the peripheral surface of the rod is securely nested against the cylindrical inner surface 60 of the clip body 56, the tips 80 of the opposite rams 70 springing back to their holding position, FIG. 8.

In the structure of FIGS. 7-9, the master cylinder input member 18 is the piston rod 28 itself, provided with a peripheral groove 82 in which is disposed a spring clip ring 84, one face of the ring 84 forming the abutment shoulder 44.

It will be appreciated by those skilled in the art that, in addition to providing a safeguard against accidental premature operation of the apparatus 10 after assembly and filling with hydraulic fluid until the apparatus is fully installed on a motor vehicle on the motor vehicle assembly line, the clip-on spacer 26 of the present invention provides a support member for the master cylinder input member 18 in the course of the assembly step consisting in connecting the input member 18 to the clutch pedal arm 32 at a particular work station on the assembly line, by presenting the clevis eye 36 at the end of the input member 18 properly indexed for installation about the pivot pin 38, FIG. 1. Furthermore, the clip-on spacer 26, after installation about the push-rod 28 of the master cylinder input member 18, provides a protective covering for the surface of the push-rod 28, preventing damaging the peripheral surface of the rod by scratching and marring as a result of accidental contact with other objects during transit, and during installation on a motor vehicle, until the clutch control apparatus 10 is ready to be operated in a normal manner.

A simplified version of a master cylinder shipping and installation clip is illustrated at 86 at FIGS. 10-12. The clip 86 is metallic and generally in the form of a slightly dished washer 88 defining a generally U-shaped member having a pair of bifurcated legs 90 formed by a slot 92 of a width smaller than the outside diameter of the master cylinder input member 18, which takes the form of the piston rod 28 itself. A circular groove 94 is formed in the peripheral surface of the rod 28 such as to accept the slot 92 of the clip 86, when the clip 86 is mounted over the rod 28, as shown at FIGS. 10 and 11. The clip 86 is preferably provided with an extension tongue 96 as an aid for holding the clip 86 when being installed in the groove 94 and removed therefrom. With the clip 86 in position in the groove 94 of the rod 28, the rod 28 is prevented from being retracted, by the slightly curved front face of the clip abutting against the end wall of the cylinder boot 50. The curvature of the clip 86, with its curved face disposed towards the resiliently deflected end face of the boot 50 presenting an inwardly correspondingly curved surface, helps in holding the clip 86 in position in the groove 94 in the rod 28. Once the clip 86 is removed, after installation of the master cylinder 12 on a motor vehicle, the master cylinder input member 18 is free to operate in a normal manner, the end wall of the cylinder boot 50, which was elastically held back in engagement with the cylinder end cover or cap 54, FIG. 10 as long as the clip 86 was in position, being then allowed to relax and extend the lip of the boot control opening 52 beyond the groove 94, FIG. 13, once the clip 86 is removed. The groove 94 in the piston rod 28 is thus constantly disposed behind the boot central opening 52 during normal operation of the master cylinder 12, thus permitting the lip of the opening 52 elastically engaged with the peripheral surface of the rod 28 to fulfil its purpose without being damaged through repeated contact with the sharp edges of the groove 94.

Having thus described the present invention by way of examples of structure well designed to accomplish the objects of the invention, modifications whereof will be apparent to those skilled in the art, what is claimed as new is as follows:

1. A shipping and installation clip for an actuator having a housing and a linearly movable input member projecting from said housing, said clip holding said input member in an extended position, said clip comprising a generally U-shaped member fitted on a peripheral portion of said input member between an end of said housing and abutment means provided on said input member, wherein said U-shaped member is formed with a pair of bifurcated legs separated by a slot of a width narrower than said abutment means, said U-shaped member is disposed with a face in engagement with said abutment means, said bifurcated legs are disposed straddling over said input member, said abutment means is a groove in said input member and said U-shaped member is removably placed with said bifurcated legs disposed in said groove, whereby said clip prevents actuation of said input member until removed therefrom.

2. In a hydraulic apparatus comprising a master cylinder having an input member linearly movable through an end of said master cylinder, a slave cylinder having an output member linearly movable relative to said slave cylinder, and a conduit connecting said master cylinder to said slave cylinder wherein said apparatus is filled with hydraulic fluid prior to shipment for installation on a functional structure for remote operation of a mechanism by said slave cylinder output member upon actuation of said master cylinder input member, means for holding said slave cylinder output member in a retracted position and means for holding said master cylinder input member in an extended position, wherein said means for maintaining said master cylinder input member is an extended position comprises a clip removably attached to said master cylinder input member, said clip having an end in abutment with corresponding abutment means integral with said input member and another end in abutment with the end of said master cylinder from which projects said input member, said clip comprising a generally U-shaped member fitted on a peripheral portion of said input member between the end of said master cylinder and said abutment means, said U-shaped member being formed with a pair of bifurcated legs separated by a slot of a width narrower than said abutment means, said U-shaped member being disposed with a face in engagement with the end of said master cylinder and another face in engagement with said abutment means, said bifurcated legs being disposed straddling over said output member, wherein said abutment means is a groove in said output member and said U-shaped member is removably placed with said bifurcated legs disposed in said groove.

3. The apparatus of claim 2 wherein said apparatus is a motor vehicle clutch actuating apparatus.

4. A method of shipping and installing a hydraulic apparatus comprising a master cylinder having a linearly movable input member, a slave cylinder having a linearly movable input member, a slave cylinder having a linearly movable output member, and a conduit connecting said master cylinder to said slave cylinder for providing passage of fluid from said master cylinder to said slave cylinder for remotely extending said slave cylinder output member by inwardly displacing said master cylinder input member, said apparatus being filled with hydraulic fluid prior to shipment and installation, said method comprising restraining said output member in a retracted position by means of a restraining strap and maintaining said input member in an extended position by means of a clip removably attached to said input member and having an end abutting with abutment means on said input member and another end abutting with an end of said master cylinder from which projects said input member, said clip comprising a generally U-shaped member fitted on a peripheral portion of said input member between the end of said housing and abutment means provided on said input member, wherein said U-shaped member is formed with a pair of bifurcated legs separated by a slot of a width narrower than said abutment means, said U-shaped member is disposed with a face in engagement with said abutment means, said bifurcated legs are disposed straddling over said output member, said abutment means is a groove in said output member and said U-shaped member is removably placed with said bifurcated legs disposed in said groove.

5. The method of claim 4 further comprising removing said clip after installation of said master cylinder and of said slave cylinder on a utilization mechanism.

6. The method of claim 5 wherein said utilization mechanism is a motor vehicle and said hydraulic apparatus is a clutch control apparatus.

7. A shipping and installation clip for an actuator having a housing and a linearly movable input member projecting from said housing, said clip holding said input member in an extended position, said clip comprising a generally U-shaped member fitted on a peripheral portion of said input member between an end of said housing and abutment means provided on said input member, wherein said U-shaped member comprises a generally channel-shaped body adapted to fit on a peripheral portion of said input member between the end of said housing and said abutment means provided on said input member, said body having a pair of substantially parallel sidewalls, said sidewalls having each a portion separated from an opposite portion of the other of said sidewalls by a space of a width less than the thickness of said input member, and said sidewall portions being elastically spreadable for allowing said input member to pass between said portions for attachment of said channel-shaped body upon said input member, whereby said clip prevents actuation of said input member until removed therefrom.

8. The clip of claim 7 further comprising an outwardly extending flange at one end of said body.

9. The clip of claim 7 further comprising a slit in one of said sidewalls for separating said resiliently spreadable sidewall portion from said sidewall, and a ramp interiorly formed on said resiliently spreadable sidewall portion for causing the distance separating said ramp from said other sidewall portion to be less than the thickness of said input member.

10. The clip of claim 7, wherein said abutment means is a shoulder abutment on said input member, and further comprising a partially annular end face at one end of said body for engagement with said shoulder abutment on said input member.

11. The clip of claim 10 further comprising a tapered surface formed at one end of said sidewalls for clearing said shoulder abutment on said input member in the course of pivoting engagement of said body with said input member and pivoting disengagement of said body from said input member.

12. The clip of claim 7 further comprising at least one projecting ear at one end of said body.

13. The clip of claim 12 further comprising an aperture disposed in said ear.

14. In a hydraulic apparatus comprising a master cylinder having an input member linearly movable through an end of said master cylinder, a slave cylinder having an output member linearly movable relative to said slave cylinder, and a conduit connecting said master cylinder to said slave cylinder wherein said apparatus is filled with hydraulic fluid prior to shipment for installation on a functional structure for remote operation of a mechanism by said slave cylinder output member upon actuation of said master cylinder input member, means for holding said slave cylinder output member in a retracted position and means for holding said master cylinder input member in an extended position, wherein said means for maintaining said master cylinder input member in an extended position comprises a clip removably attached to said master cylinder input member, said clip having an end in abutment with corresponding abutment means integral with said input member and another end in abutment with the end of said master cylinder from which projects said input member, said clip comprising a generally U-shaped member fitted on a peripheral portion of said input member between the end of said master cylinder and said abutment means, wherein said U-shaped member comprises a generally channel-shaped body adapted to fit on a peripheral portion of said input member between the end of said master cylinder and said abutment means, said body having a pair of substantially parallel sidewalls, said sidewalls having each a portion separated from an opposite portion of the other sidewalls by a space of a width less than the thickness of said input member, and said sidewall portions being elastically spreadable for allowing said input member to pass between said portions for attachment of said channel-shaped body upon said input member.

15. The apparatus of claim 14 wherein said U-shaped member further comprises an outwardly extending flange at one end of said body.

16. The apparatus of claim 14 further comprising a slit in one of said sidewalls for separating said resiliently spreadable sidewall portion from said sidewall, and a ramp interiorly formed on said resiliently spreadable sidewall portion for causing the distance separating said ramp from said other sidewall portion to be less than the thickness of said input member.

17. The apparatus of claim 14 wherein said apparatus is a motor vehicle clutch actuating apparatus.

18. The apparatus of claim 14, wherein said abutment means is a shoulder abutment on said input member, and further comprising a partially annular end face at one end of said body for engagement with said shoulder abutment on said input member.

19. The apparatus of claim 18 further comprising a tapered surface formed at one end of said sidewalls for clearing said shoulder abutment on said input member in the course of pivoting engagement of said body with said input member and pivoting disengagement of said body from said input member.

20. The apparatus of claim 14 further comprising at least one projecting ear at one end of said body.

21. The apparatus of claim 20 further comprising an aperture disposed in said ear.

22. A method of shipping and installing a hydraulic apparatus comprising a master cylinder having a linearly movable input member, a slave cylinder having a linearly movable output member, and a conduit connecting said master cylinder to said slave cylinder for providing passage of fluid from said master cylinder to said slave cylinder for remotely extending said slave cylinder output member by inwardly displacing said master cylinder input member, said apparatus being filled with hydraulic fluid prior to shipment and installation, said method comprising restraining said output member in a retracted position by means of a restraining strap and maintaining said input member in an extended position by means of a clip removably attached to said input member and having an end abutting with abutment means on said input member and another end abutting with an end of said master cylinder from which projects said input member, wherein said clip comprises a generally U-shaped member fitted on a peripheral portion of said input member between the end of said housing and abutment means provided on said input member, said U-shaped member comprising a generally channel-shaped body adapted to fit on a peripheral portion of said input member between the end of said master cylinder and said abutment means, said body having a pair of substantially parallel sidewalls, said sidewalls having each a portion separated from an opposite portion of the other of said sidewalls by a space of a width less than the thickness of said input member, and said sidewall portions being elastically spreadable for allowing said input member to pass between said portions for attachment of said channel-shaped body upon said input member.

23. The method of claim 22 wherein said clip further comprises an outwardly extending flange at one end of said body.

24. The method of claim 22 further comprising removing said clip after installation of said master cylinder and of said slave cylinder on a utilization mechanism.

25. The method of claim 24 wherein said utilization mechanism is a motor vehicle and said hydraulic apparatus is a clutch control apparatus.

26. The method of claim 22, wherein said abutment means is a shoulder abutment on said input member, and said clip further comprises a partially annular end face at one end of said body for engagement with said shoulder abutment on said input member.

27. The method of claim 26 wherein said clip further comprises a tapered surface formed at one end of said sidewalls for clearing said shoulder abutment on said input member in the course of pivoting engagement of said body with said input member and pivoting disengagement of said body from said input member.

28. The method of claim 22 wherein said clip further comprises at least one projecting ear at one end of said body.

29. The method of claim 28 wherein said clip further comprises an aperture disposed in said ear.

* * * * *